Figure 1:
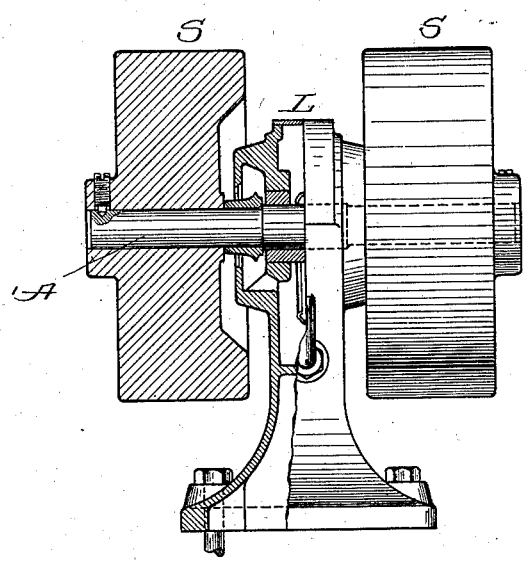

No. 752,827. PATENTED FEB. 23, 1904.
G. DETTMAR.
MEANS FOR TESTING LUBRICATING SUBSTANCES.
APPLICATION FILED AUG. 15, 1902.
NO MODEL.

No. 752,827.

Patented February 23, 1904.

UNITED STATES PATENT OFFICE.

GEORG DETTMAR, OF FRANKFORT-ON-THE-MAIN, GERMANY, ASSIGNOR TO SOCIETY OF ELECTRICITÄTS-ACTIEN-GESELLSCHAFT, VORM. W. LAHMEYER & CO., OF FRANKFORT-ON-THE-MAIN, GERMANY.

MEANS FOR TESTING LUBRICATING SUBSTANCES.

SPECIFICATION forming part of Letters Patent No. 752,827, dated February 23, 1904.

Application filed August 15, 1902. Serial No. 119,781. (No model.)

*To all whom it may concern:*

Be it known that I, GEORG DETTMAR, electrical engineer, a subject of the German Emperor, residing and having my post-office address at 45 Höchsterstrasse, Frankfort-on-the-Main, Germany, have invented certain new and useful Improvements in Means for Testing Lubricating Substances, of which the following is a specification.

In order to be able to judge of the quality of a lubricating-oil, it is not sufficient to examine it chemically and to determine its viscosity, but it is also necessary to know the coefficient of friction of the oil. Various apparatus have been constructed for this purpose, among which the best known is that used by the "Koniglich Technische Tersuchs-Anstalt" (see *Mitteilungen aus den Koniglich Technischen Versuchs-Anstalten*, 1890) and the one described in the *Zeitschrift des Vereins Deutscher Ingenieure*, (1898, page 553.) The first-mentioned apparatus is based on the principle of the friction-pendulum, which has long been known. This apparatus is very complicated and only suitable for scientific investigations, its high price preventing its use for practical oil tests. The second of the aforesaid apparatus is especially constructed for the testing of oils for lubricating spindles and is consequently adapted to the conditions under which the spindles work. Although this apparatus is eminently suitable for this purpose, it is not adapted to the investigation of friction of ordinary journal-bearings, as there is besides the friction in the spindle-guides the friction of the bearing, so that an exact determination of the coefficient of friction is attended with difficulties.

The present invention has for its object to construct an oil-testing apparatus which has the advantage of being very simple and cheap, and as it gives very accurate results it may also be used for scientific investigations.

It is well known that if a shaft rests in two bearings it is not possible to judge accurately if the pressure is everywhere alike, as the least inaccuracy in the relative position of the said two bearings causes the journals to lie unevenly on their brasses. According to my invention, to obviate this disadvantage the shaft is supported by one bearing only, so that with a symmetrical arrangement of the apparatus a perfectly uniform distribution of the pressure on the bearing-surface is permanently insured.

In order to exert on the bearing a pressure corresponding to the conditions obtaining in practice, a disk fly-wheel (I will refer to them as "fly-wheels") is provided one on each side of the bearing, the weight of these fly-wheels being such as to give the required load on the bearing.

Figure 2:
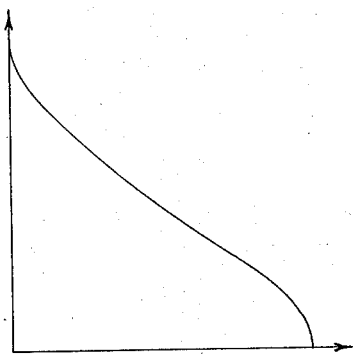

In the drawings, Figure 1 is an elevation of the apparatus, partly in section; and Fig. 2 is a diagram.

A is the shaft, which is mounted in a single bearing L midway between its ends, and S S are two fly-wheels of equal weight carried by the shaft on opposite sides of the bearing, so as to balance each other. In this manner it is possible to determine the friction corresponding to a given number of revolutions. The following is another method for ascertaining journal-friction which is remarkable for its simplicity and rapidity of operation.

If the apparatus be set into rotation, the amount of energy stored in it is given by the well-known formula: $A = \frac{J}{2} W^2$, J being the moment of inertia of the rotating body, and W its angular velocity. To maintain the rotation, an expenditure of work is required in order to overcome the resistance of the air and journal-friction. If the supply of motive power to the apparatus be cut off, the number of revolutions decreases gradually until the rotating part comes to rest, the energy stored in the body being absorbed by the resistance of the air and the friction of the bearing. As the energy stored in the body is known for every number of revolutions, it is possible to calculate, from the manner in which the number of revolutions decreases, the work absorbed by the resistance of the air and the friction of the bearing, and consequently also the loss caused by friction at any speed.

The testing of an oil may be shown in a simple manner by a curve, the abscissa of which represent periods of time, while the ordinates are the number of revolutions corresponding to any of the periods of time, as shown by Fig. 2 of the accompanying drawings.

I claim—

An apparatus for testing lubricating substances, comprising a support having a single bearing, a shaft mounted in the bearing and projecting an equal distance from opposite sides thereof, and two fly-wheels of equal weight mounted on the shaft on opposite sides of said bearing, whereby a uniform distribution of the pressure on the bearing-surface is insured and the lubricant tested by the measure of friction, substantially as described.

In testimony whereof I have signed my name to this specification in the presence of two subscribing witnesses.

GEORG DETTMAR.

Witnesses:
FRANZ HASSLACHER,
MICHAEL VOLK.